A. C. BURLINGAME.
COLLAPSIBLE FRUIT JAR HOLDER.
APPLICATION FILED AUG. 22, 1919. RENEWED FEB. 3, 1922.
1,429,675.
Patented Sept. 19, 1922.
2 SHEETS—SHEET 1.
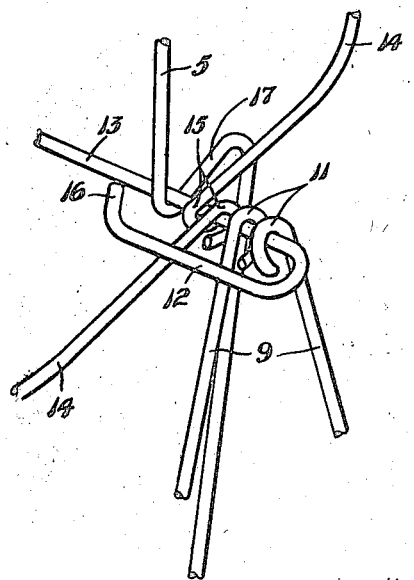
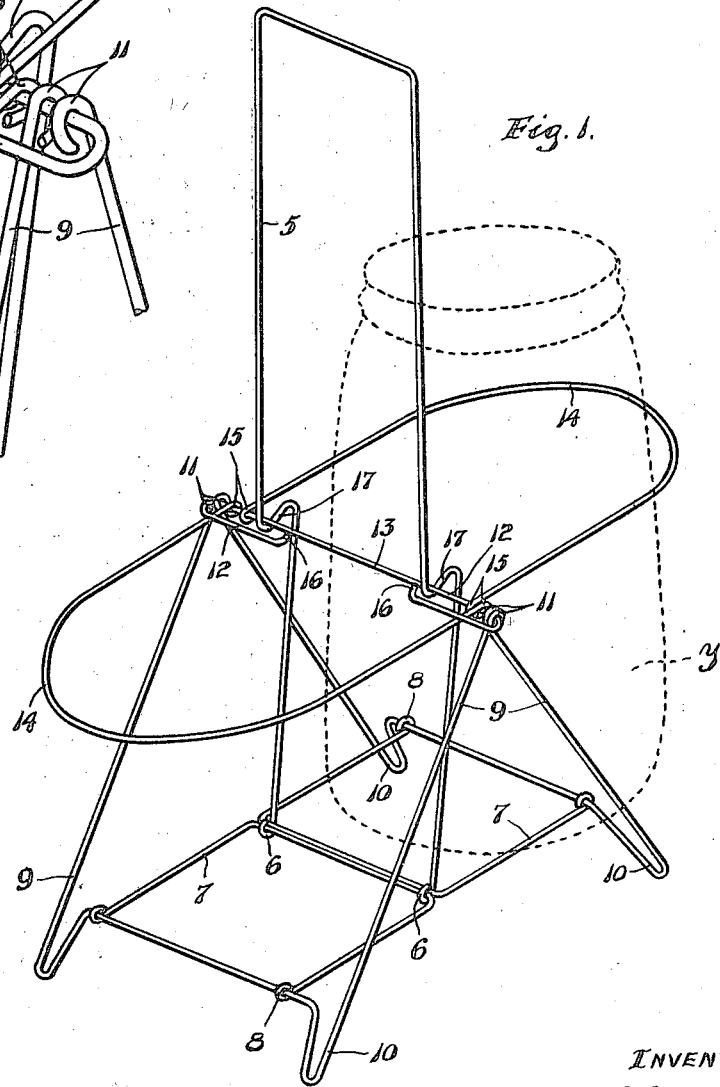
INVENTOR.
ALBERT C. BURLINGAME
BY HIS ATTORNEYS.

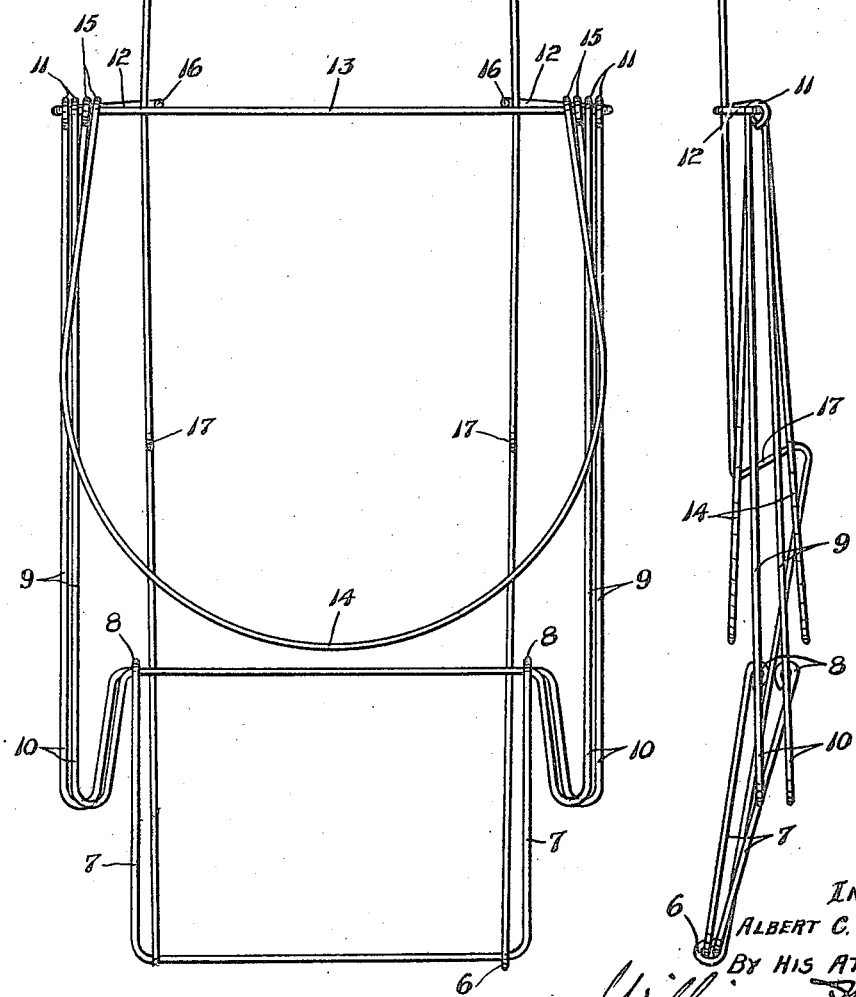

Patented Sept. 19, 1922.

1,429,675

UNITED STATES PATENT OFFICE.

ALBERT C. BURLINGAME, OF MINNEAPOLIS, MINNESOTA, ASSIGNOR OF ONE-THIRD TO D. A. FRERICHS AND ONE-THIRD TO ANTON LARSON, BOTH OF MINNEAPOLIS, MINNESOTA.

COLLAPSIBLE FRUIT-JAR HOLDER.

Application filed August 22, 1919, Serial No. 319,104. Renewed February 3, 1922. Serial No. 533,980.

*To all whom it may concern:*

Be it known that I, ALBERT C. BURLINGAME, a citizen of the United States, residing at Minneapolis, in the county of Hennepin and State of Minnesota, have invented certain new and useful Improvements in Collapsible Fruit-Jar Holders; and I do hereby declare the following to be a full, clear, and exact description of the invention, such as will enable others skilled in the art to which it appertains to make and use the same.

My present invention has for its object to provide a simple and highly efficient holder and carrier for fruit jars, and which holder, when out of use, may be collapsed and packed in small space for shipment or storage. To the above end, generally stated, the invention consists of the novel devices and combinations of devices, hereinafter described and defined in the claims.

The so-called holder may be designed to carry two, four, or more jars, but as shown in the drawings, it is designed to take but two jars.

In the accompanying drawings, like characters indicate like parts throughout the several views.

Referring to the drawings:

Fig. 1 is a perspective view of the improved holder, a jar being indicated by dotted lines;

Fig. 2 is a fragmentary perspective, showing the manner in which the various elements of the holder are connected together;

Fig. 3 is a front elevation of the holder showing the same collapsed, as is merely a flat form; and Fig. 4 is a side elevation of the parts adjusted as shown in Fig. 3.

The handle member of the holder is in the form of a carrying bail 5 made from a single piece of wire bent into rectangular form and provided at its lower end with eyes 6 that pivotally connect the transverse portion of a pair of reversely disposed base yokes, or U-shaped wires members 7. These U-shaped wire base members 7, at their outer ends, are provided with eyes 8 pivoted on transverse portion of U-shaped leg members 9. These leg members 9, to form supporting feet, are bent into approximately U-shaped form at 10. At the upper ends of their sides, the U-shaped members 9 are provided with eyes 11 that are pivoted to the loop end 12 of a pivot bar 13.

Approximately U-shaped jar holding yoke 14, made of wire are provided at the ends of their sides with eyes 15 pivoted on the ends of the pivot rod 13, as best shown in Figs. 1 and 2. Here, it should be noted that the handle forming bail 5, is passed through the loop ends 12 of the pivot rod 13 and provided with offset stop shoulders 17 that limit the upward movement of said bail through the two loops of said pivot rod.

Fig. 1 shows the holders opened up for use to support two jars Y. When the jars are inserted through the holding yoke 14, the bottoms will rest on the arms of the base members 7 and on the transverse portion of the leg forming members 9. When the device is then picked up by taking hold of the top of the bail 5, the stop shoulders 17 of said bail will engage the pivot rod 13 and limit the upward movement of the bail, causing the bail to serve as a handle for carrying the entire device with its load to-wit, with the jars. When the holder is thus used, it serves as an efficient device for carrying filled fruit jars, and by the use thereof, the jars may be set in boiling water and filled or otherwise handled and then picked out of the boiling water without getting the hands into the boiling water. The utility of this device will be appreciated by all persons who put up fruit or vegetables in jars.

What I claim is:

1. A jar holder comprising U-shaped leg members, a pivot rod to which the upper ends of said leg members are pivoted, a U-shaped carrying bail having intermediate stop shoulders movable to and from engagement with said pivot rod, toggle-acting brace yokes pivoted to the lower portions of said leg members, and U-shaped jar holding yokes pivotally connected to said pivot rod, and the complete holder being adapted to be folded when said carrying bail is pressed downward.

2. A jar holder comprising a transverse pivot rod with looped ends, U-shaped leg members having the upper ends of their prongs pivoted to the looped ends of said pivot rod, a U-shaped carrying bail having its legs passed through the looped ends of said pivot rod and provided with intermediate stop shoulders engageable therewith to limit the upward movement of the bail, toggle-acting U-shaped links pivoted to the lower ends of the prongs of said carrying bail and to the transverse lower portions of said leg members, and jar holding yokes pivoted to the looped ends of said pivot rod.

3. A jar holder comprising a transverse pivot rod with looped ends, U-shaped leg members having the upper ends of their prongs pivoted to the looped ends of said pivot rod, a U-shaped carrying bail having its legs passed through the looped ends of said pivot rod and provided with intermediate stop shoulders engageable therewith to limit the upward movement of the bail, toggle-acting U-shaped links pivoted to the lower ends of the prongs of said carrying bail and to the transverse lower portions of said leg members, jar holding yokes pivoted to the looped ends of said pivot rod, the transverse lower portions of said leg members being bent and raised to form bearing feet at the extreme lower portions of said legs, and the complete device being adapted to be folded when said bail is forced downward and to be opened up and adapted to hold and carry jars when said bail is raised to force its intermediate stop shoulders against the looped ends of said pivot rod.

In testimony whereof I affix my signature in presence of two witnesses.

ALBERT C. BURLINGAME.

Witnesses:
  CLARA DEMAREST,
  BERNICE G. BAUMANN.